US008948825B2

(12) United States Patent
Matsushima et al.

(10) Patent No.: US 8,948,825 B2
(45) Date of Patent: Feb. 3, 2015

(54) PORTABLE TERMINAL DEVICE

(75) Inventors: Manabu Matsushima, Kawasaki (JP); Manabu Takase, Kawasaki (JP); Kensuke Yamada, Kawasaki (JP); Hiroshi Kubo, Kawasaki (JP); Hiroyuki Takita, Kawasaki (JP); Yoshifumi Kajiwara, Kawasaki (JP); Haruyoshi Yada, Kawasaki (JP); Kenta Sugimori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1025 days.

(21) Appl. No.: 13/027,645

(22) Filed: Feb. 15, 2011

(65) Prior Publication Data

US 2011/0223975 A1 Sep. 15, 2011

(30) Foreign Application Priority Data

Mar. 15, 2010 (JP) ................................ 2010-056923

(51) Int. Cl.
*H04M 1/00* (2006.01)
*H04R 1/02* (2006.01)
*H04R 1/08* (2006.01)

(52) U.S. Cl.
CPC ................ *H04R 1/028* (2013.01); *H04R 1/086* (2013.01); *H04R 1/023* (2013.01); *H04R 2499/11* (2013.01)
USPC .................. 455/575.1; 455/575.2; 455/575.4; 455/575.8; 455/566; 455/90.3

(58) Field of Classification Search
CPC ..... H04M 1/026; H04M 1/04; H04M 1/0202; H04M 1/0235; H04M 1/0249; H04M 1/0262; H04M 1/035; H04M 1/23; H04M 1/0237; H04M 1/0274; H04M 1/0254; H01Q 1/44; H01Q 1/50; H04B 1/38; H04B 1/3827
USPC ............... 455/575.8, 575.1, 566, 90.3, 404.1, 455/757.1, 575.2, 575.3, 575.4, 575.7; 29/592.1; 361/679.09
See application file for complete search history.

(56) References Cited

U.S. PATENT DOCUMENTS

2005/0181745 A1* 8/2005 Wood et al. ................. 455/90.3
2005/0220448 A1 10/2005 Tei et al.

(Continued)

FOREIGN PATENT DOCUMENTS

CN 1642355 A 7/2005
CN 1666565 A 9/2005

(Continued)

OTHER PUBLICATIONS

Chinese Office Action dated Apr. 18, 2013, issued in corresponding Chinese Patent Application No. 201110045656.1, wi English translation.

(Continued)

*Primary Examiner* — Fred Casca
(74) *Attorney, Agent, or Firm* — Westerman, Hattori, Daniels & Adrian, LLP

(57) ABSTRACT

A portable terminal device includes: a converting portion converting one of sound and an electrical signal into the other thereof; and a chassis defining: an opening; a passageway portion communicating the opening and the converting portion with each other; and a retainer portion retaining water that has entered the passageway portion, divaricated from the passageway portion, and the converting portion being arranged within the chassis apart from an axis of the opening.

3 Claims, 9 Drawing Sheets

(56) References Cited

U.S. PATENT DOCUMENTS

| | | | | |
|---|---|---|---|---|
| 2005/0233781 | A1 | 10/2005 | Erixon et al. | |
| 2006/0037807 | A1 | 2/2006 | Hongo et al. | |
| 2006/0258325 | A1 * | 11/2006 | Tsutaichi et al. | 455/350 |
| 2007/0026905 | A1 | 2/2007 | Murray | |
| 2009/0264165 | A1 * | 10/2009 | Hakamata et al. | 455/575.1 |
| 2011/0059719 | A1 * | 3/2011 | Spielvogel et al. | 455/404.1 |

FOREIGN PATENT DOCUMENTS

| | | | |
|---|---|---|---|
| JP | 2004-056165 | A | 2/2004 |
| JP | 2005-229318 | A | 8/2005 |
| JP | 2006-60398 | A | 3/2006 |
| JP | 2009-5043 | A | 1/2009 |
| JP | 2010-34684 | A | 2/2010 |

OTHER PUBLICATIONS

Japanese Office Action dated Apr. 16, 2013, issued in corresponding Japanese Patent Application No. 2010-056923, w/ English translation.

* cited by examiner

PORTABLE TERMINAL DEVICE

CROSS-REFERENCE TO RELATED APPLICATION

This application is based upon and claims the benefit of priority of the prior Japanese Patent Application No. 2010-056923, filed on Mar. 15, 2010, the entire contents of which are incorporated herein by reference.

FIELD

An embodiment discussed herein is related to a portable terminal device.

BACKGROUND

There is known a portable terminal device provided with a chassis in which at least one of a microphone and a receiver is installed. The microphone converts sound into electrical signals. The receiver converts electrical signals into sound. The chassis is provided with an opening communicated to the microphone or the receiver. The opening is positionally set such that an axis thereof passes through the microphone or the receiver. Japanese Unexamined Patent Application Publication No. 2004-56165 discloses the technology relating to such a portable terminal device.

However, it is conceivable that the opening is arranged apart from the opening, the microphone in light of design characteristics of the chassis. In this case, if water enters a passageway from the opening to the microphone or the receiver, the water might be retained in the passageway. The water retained in the passageway might influence acoustical characteristics.

SUMMARY

Accordingly, it is an object in one aspect of the embodiment to provide a portable terminal device including: a converting portion converting one of sound and an electrical signal into the other thereof; and a chassis defining: an opening; a passageway portion communicating the opening and the converting portion with each other; and a retainer portion retaining water that has entered the passageway portion, divaricated from the passageway portion, and the converting portion being arranged within the chassis apart from an axis of the opening.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of a portable telephone as an example of a portable terminal device.

Figure 1A:
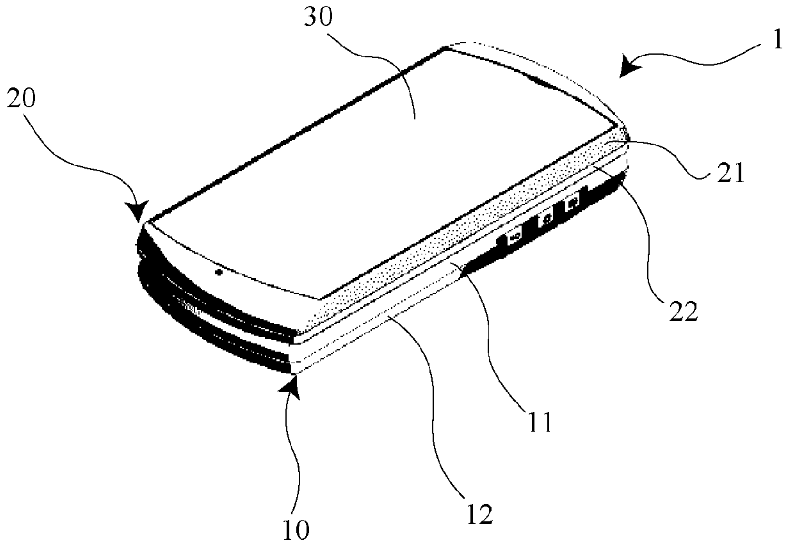
FIGS. 1A and 1B are explanatory views of a portable telephone according to a present embodiment.
Figure 1B:
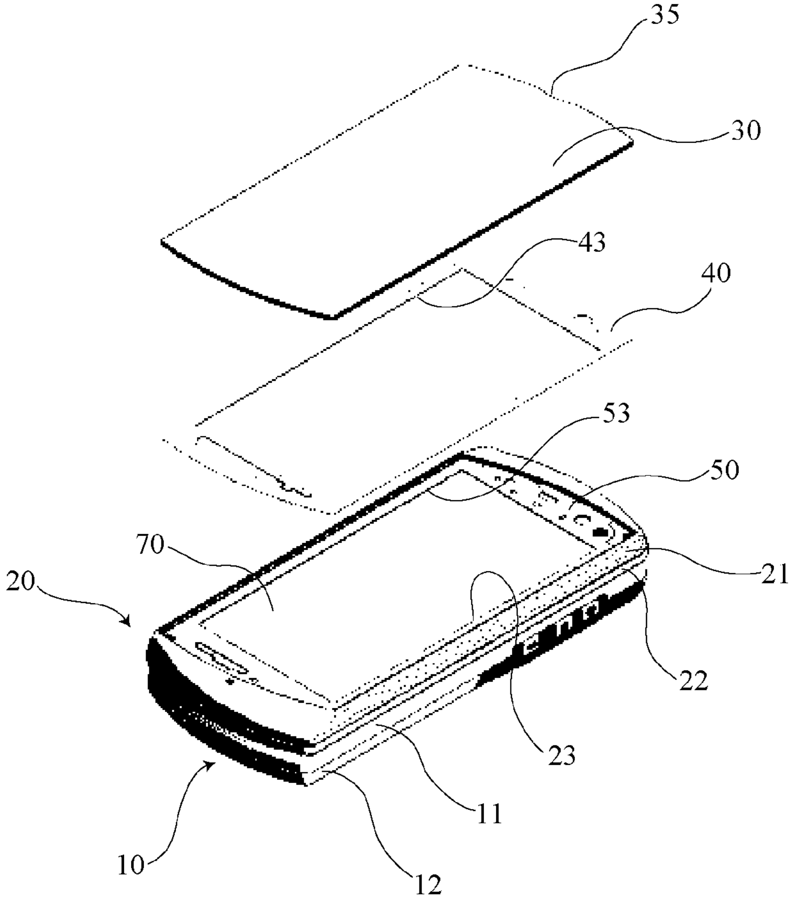

FIGS. 1A and 1B are explanatory views of a portable telephone 1. As illustrated in FIG. 1A, the portable telephone 1 includes chassis 10 and 20 slidably connected to each other. FIG. 1A illustrates the portable telephone 1 with the chassis 10 and 20 closed. The chassis 10 includes a front case 11 and a rear case 12. The chassis 20 includes a front case 21 and a rear case 22. The front case 11 of the chassis 10 is provided with plural operation keys not illustrated. The chassis 20 slides relative to the chassis 10 to expose the operation keys provided in the front case 11 of the chassis 10. The front case 21 is provided with a touch panel 30. The touch panel 30 is a capacitance type or a resistive film type. The chassis 20 has a built-in receiver as will be described later in detail. The chassis 10 has a microphone built therein.

FIG. 1B is a view of the portable telephone 1 before the touch panel 30 is attached to the chassis 20.

As illustrated in FIG. 1B, the front case 21 has a frame shape, and has an opening 23 with a substantially rectangular shape. The front case 21 is assembled with a support plate 50. The support plate 50 is made of metal with a frame shape, and has an opening 53 with a substantially rectangular shape. A liquid crystal display 70 displaying images is arranged at a rear side of the support plate 50.

The touch panel 30 is arranged at a front side of the support plate 50. A double-stick tape 40 for waterproof is attached between the support plate 50 and the touch panel 30. The touch panel 30 is held by the support plate 50. The double-stick tape 40 prevents water from entering the chassis 20 through the opening 53 and the clearance between the touch panel 30 and the support plate 50. The shape of the double-stick tape 40 corresponds to that of the support plate 50. The double-stick tape 40 has a frame shape and an opening 43 with a substantially rectangular shape. Any one of the opening 53 of the support plate 50 and the opening 43 of the double-stick tape 40 is provided for ensuring the visibility of the liquid crystal display 70.

At the upper end of the touch panel 30, a cutout portion 35 is formed. The cutout portion 35 and the opening 23 of the front case 21 define an opening, as will be described later.

Figure 2:
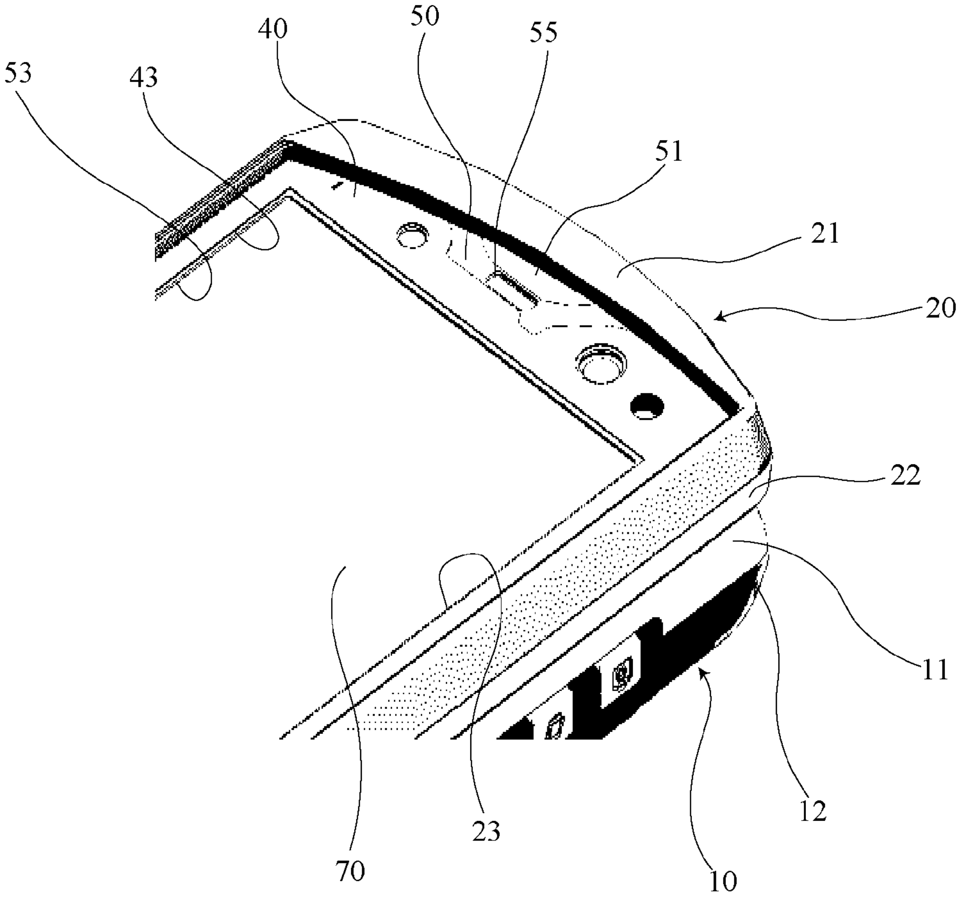
FIG. 2 is a perspective view of the portable telephone before a touch panel is attached to a chassis.

FIG. 2 is a perspective view of the portable telephone 1 before the touch panel 30 is attached to the chassis 20. The double-stick tape 40 is attached on the front side of the support plate 50. The support plate 50 is provided with an opening 55. The opening 55 defines a passageway to the receiver from the opening defined by the cutout portion 35 of the touch panel 30 and the opening 23 of the front case 21. The passageway will be described later in detail.

Figure 3:
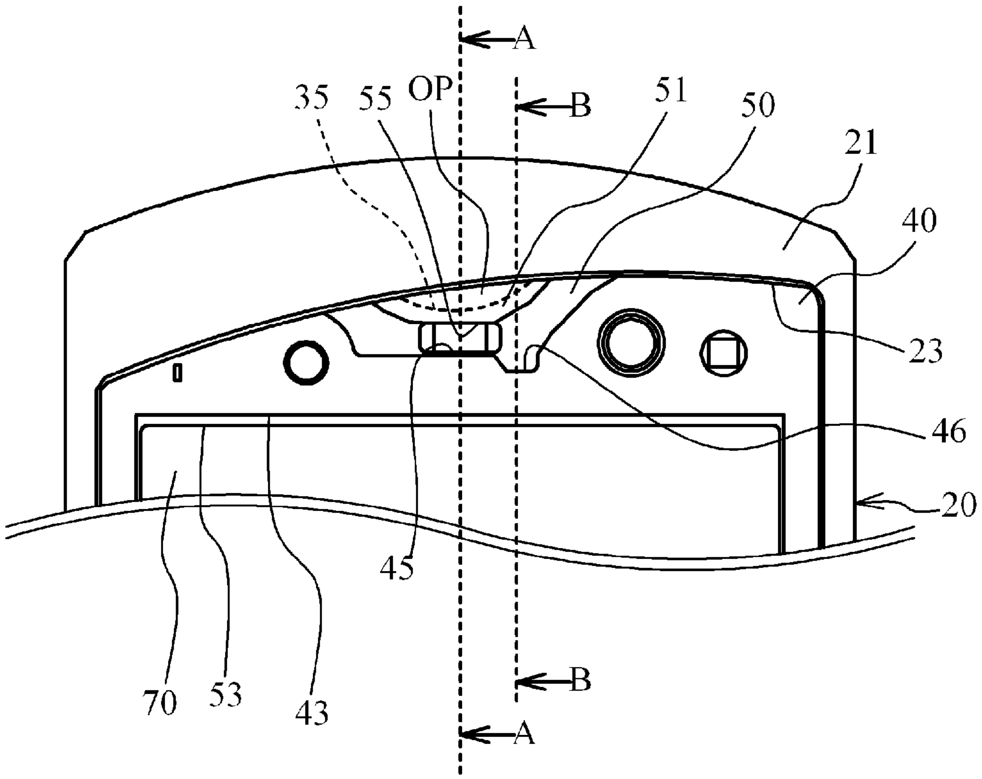
FIG. 3 is a front view of the portable telephone before the touch panel is attached to the chassis.

FIG. 3 is front view of the portable telephone 1 before the touch panel 30 is attached to the chassis 20. Additionally, in FIG. 3, the cutout portion 35 is illustrated by a broken line when the touch panel 30 is attached. The opening OP mentioned above is defined by the cutout portion 35 of the touch panel 30 and the opening 23 of the chassis 20. The opening OP has a slit shape. A sheet 51 is attached on the support plate 50 to prevent the support plate 50 from being viewed from the opening OP. The double-stick tape 40 includes: a straight portion 45 along the opening 55; a cutout portion 46 continuous to the straight portion 45. The cutout portion 46 continues to the right lower side of the straight portion 45, when viewed from the front side of the chassis 20.

Figure 4:
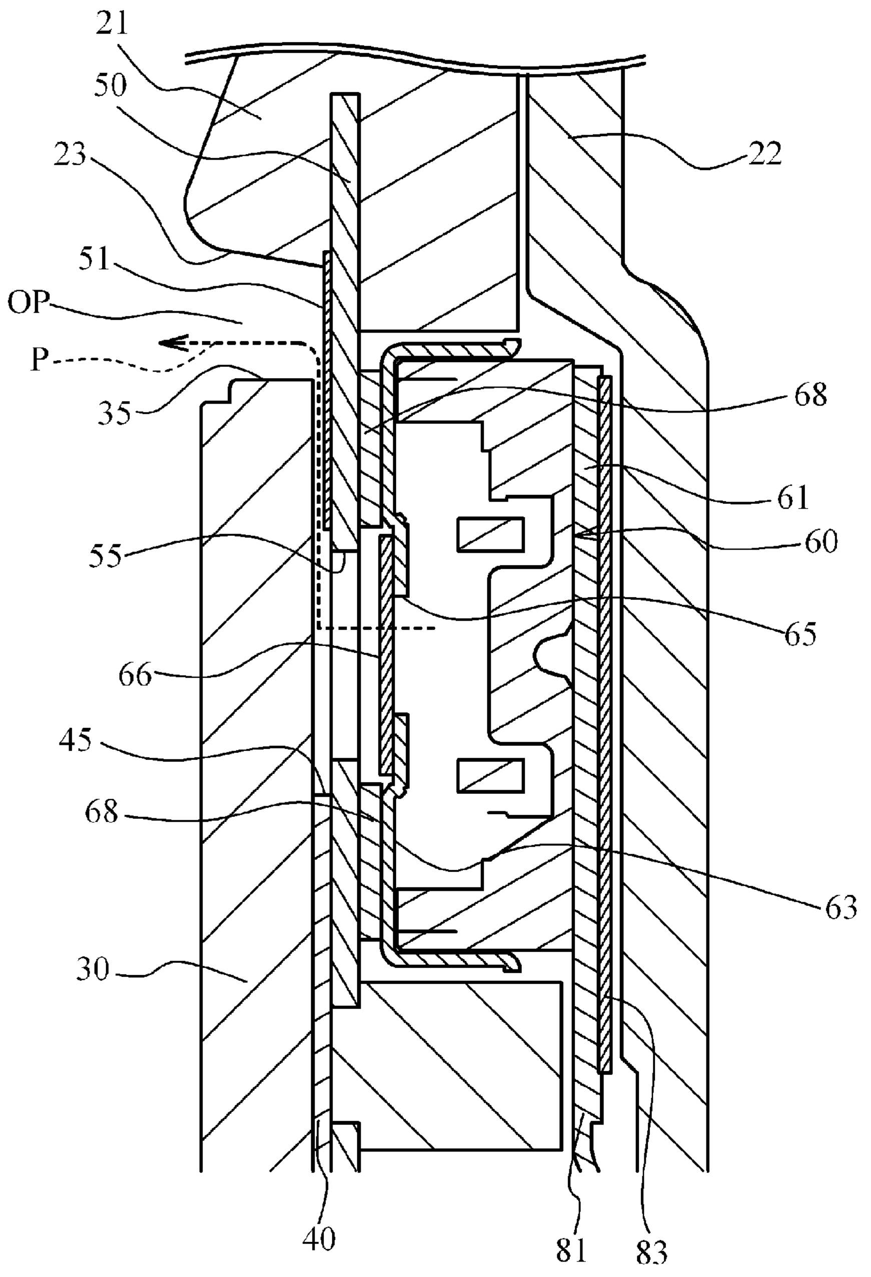
FIG. 4 is a cross-sectional view taken along line A-A of FIG. 3.
Figure 5:
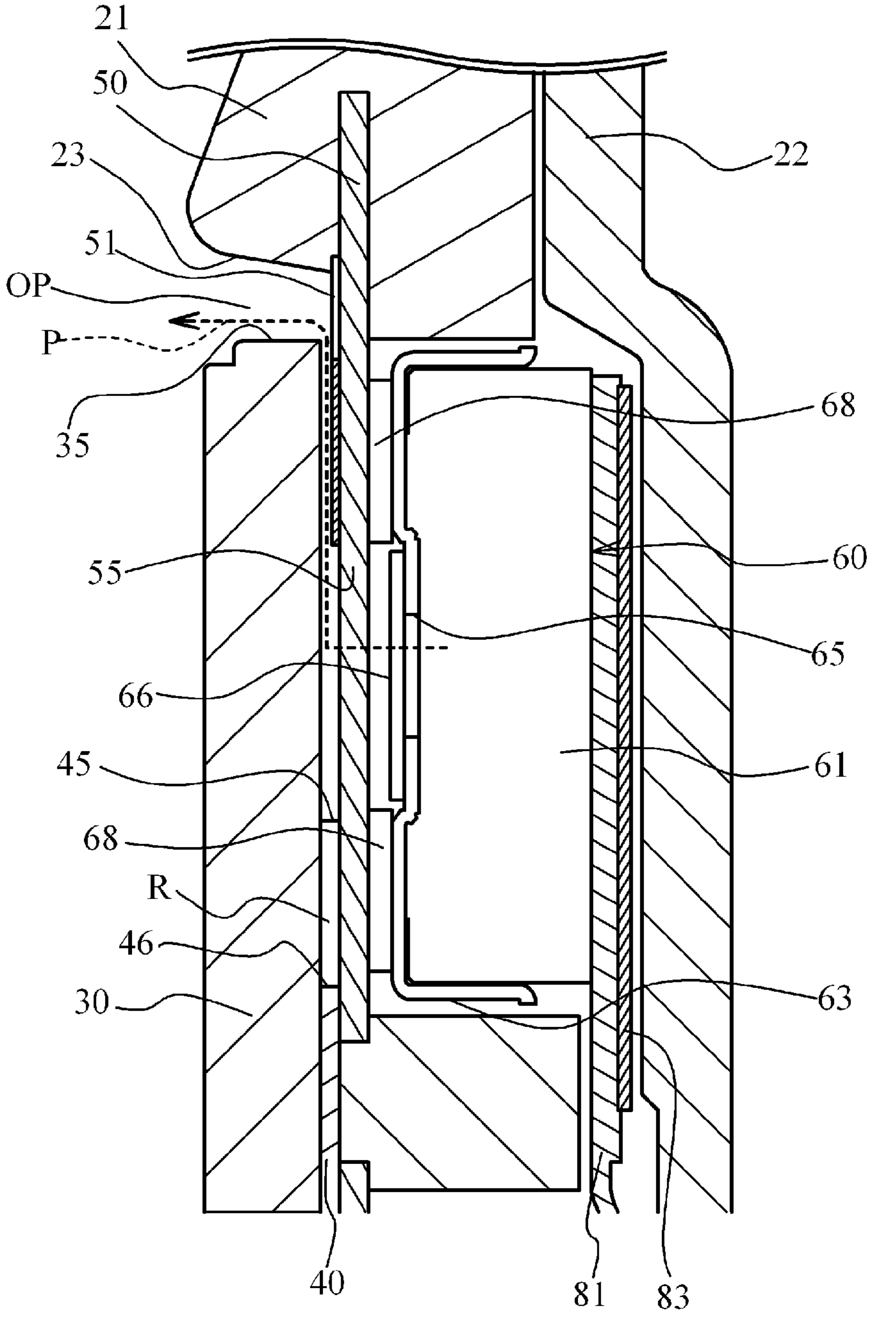
FIG. 5 is a cross-sectional view take along line B-B of FIG. 3.

FIG. 4 is a cross-sectional view taken along line A-A of FIG. 3. FIG. 5 is a cross-sectional view taken along line B-B of FIG. 3. Additionally, in FIGS. 4 and 5, the chassis 20 attached with the touch panel 30 is illustrated, whereas the chassis 10 and other components are omitted. As illustrated in FIG. 4, a receiver 60 is installed at the rear side of the opening 55 of the support plate 50. The receiver 60 converts electrical signals into sound to output sound. The receiver 60 outputs the voice of the caller. The receiver 60 is mounted on a flexible printed circuit board 81. The receiver 60 is electrically connected to a wiring pattern of the flexible printed circuit board 81. At the rear side of the flexible printed circuit board 81, a holding plate 83 is arranged for holding the flexible printed circuit board 81. The holding plate 83 is made of metal.

The receiver 60 includes: a receiver main body 61 mounted on the flexible printed circuit board 81, a half case 63 assembled at the front side of the receiver main body 61, and a buffering member 68 secured to the front side of the half case 63. The half case 63 is made of metal. The buffering member 68 is made of sponge. The opening 65 is formed in the center of the half case 63. The opening 65 is covered with a sheet 66. The sheet 66 is made of a synthetic resin, and has a thin sheet shape. Plural micropores are formed in the sheet 66. For this reason, although water does not pass through the sheet 66, sound passes therethrough. The buffering member 68 is sandwiched between the half case 63 and the support plate 50 to buffer the shock to the receiver 60.

As illustrated in FIG. 4, the receiver 60 is located apart from the axis of the opening OP. In other words, the central axis of the receiver 60 does not match the axis of the opening OP. The central axis of the receiver 60 is an axis passing through the center thereof.

FIG. 4 illustrates a passageway P for outputting sound from the receiver 60. The passageway P passes through the opening 65 of the receiver 60, the sheet 66, and a clearance between the rear surface of the touch panel 30 and the front surface of the support plate 50, and reaches the opening OP. The passageway P is defined by the touch panel 30, the support plate 50, and the double-stick tape 40. As mentioned above, the opening OP is set at the position where the axis thereof is located apart from the receiver 60. For this reason, the shape of the passageway P is not only a single straight line, but also a combination of plural straight lines. Additionally, the passageway P may be curved. Thus, the chassis 20 defines the passageway P communicating the opening OP and the receiver 60 with each other. Also, as illustrated in FIG. 4, the straight portion 45 of the double-stick tape 40 is located in the outside of the opening 55 of the support plate 50.

As illustrated in FIG. 5, the cutout portion 46 is located at the lower side from the straight portion 45. A portion, which is surrounded by the cutout portion 46 of the double-stick tape 40, the rear surface of the touch panel 30, and the front surface of the front case 21, functions as a retainer portion R. The retainer portion R is defined by the touch panel 30, the support plate 50, and the cutout portion 46 of the double-stick tape 40. The retainer portion R continues to the passageway P, and functions to retain water that has entered the passageway P. The retainer portion R is formed at a position which is divaricated from the passageway P. The retainer portion R will be described later in detail.

Next, a case where water has entered the passageway P will be described.

Figure 6A:
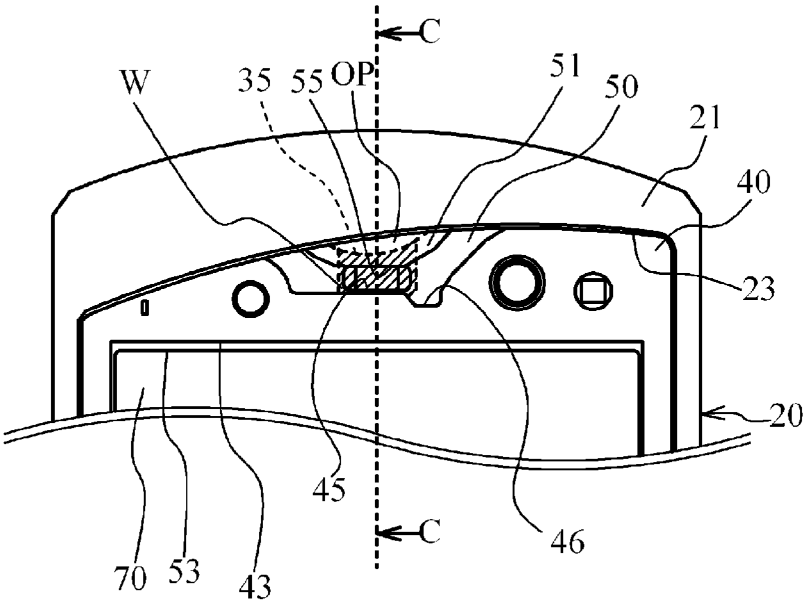
FIGS. 6A and 6B are explanatory views when water enters a passageway.
Figure 6B:
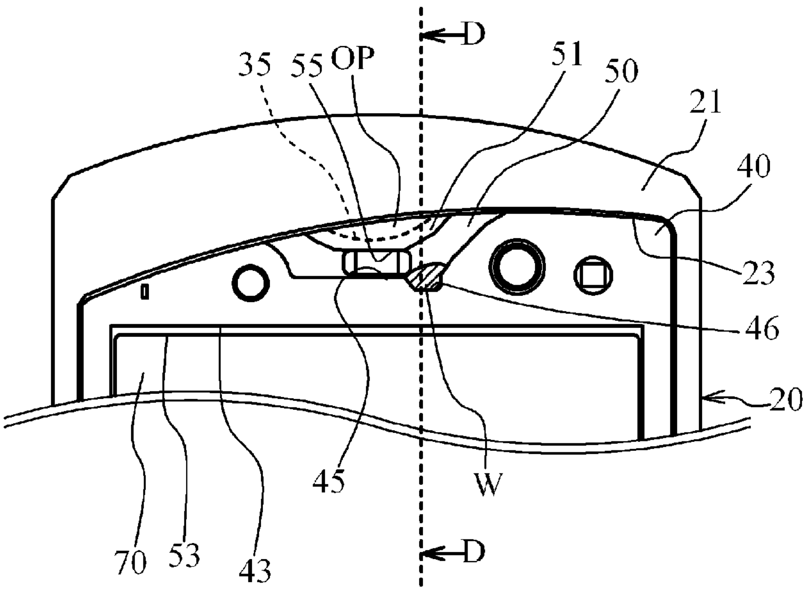
Figure 7A:
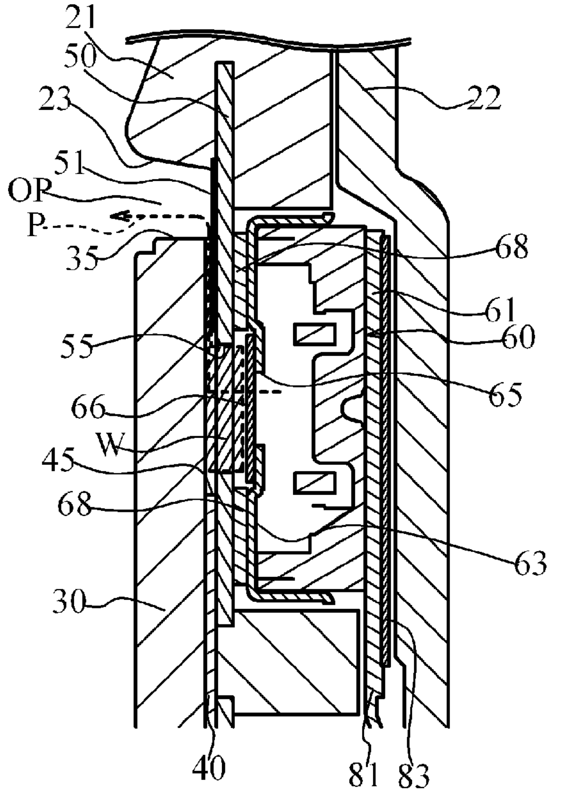
FIGS. 7A and 7B are explanatory views when water enters the passageway.

FIGS. 6A, 6B, 7A, and 7B are explanatory views of the case where water has entered the passageway P. At first, when the water W enters from the opening OP, the water W is retained within the passageway P as illustrated in FIGS. 6A and 7A. For this reason, the water W influences on the sound output from the receiver 60 to influence on acoustical characteristics. Specifically, it is difficult to hear the sound output from receiver 60.

Figure 7B:
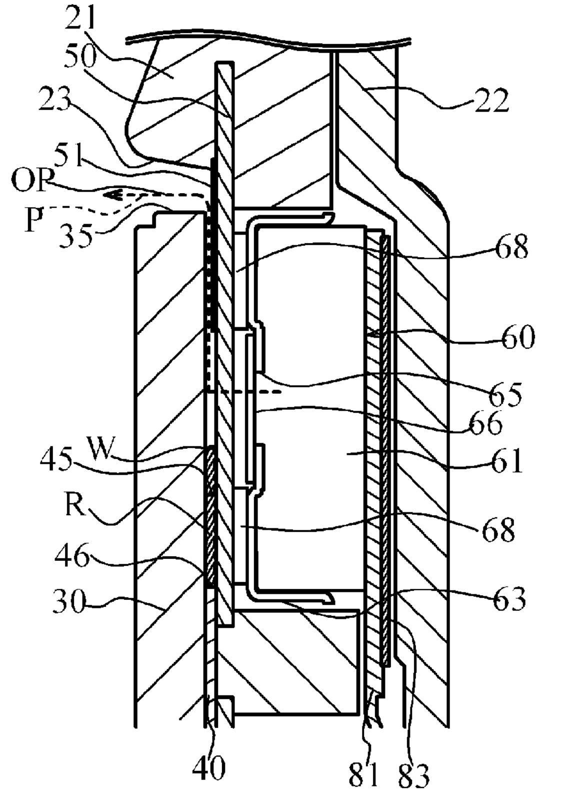

However, the portable telephone 1 is operated in a given way, whereby the water W flows from the passageway into the retainer portion R to be retained therein, as illustrated in FIGS. 7A and 7B. The water W recedes from the passageway P, thereby ensuring the passage for passing the sound. This suppresses the influence on the acoustical characteristics.

Figure 8:
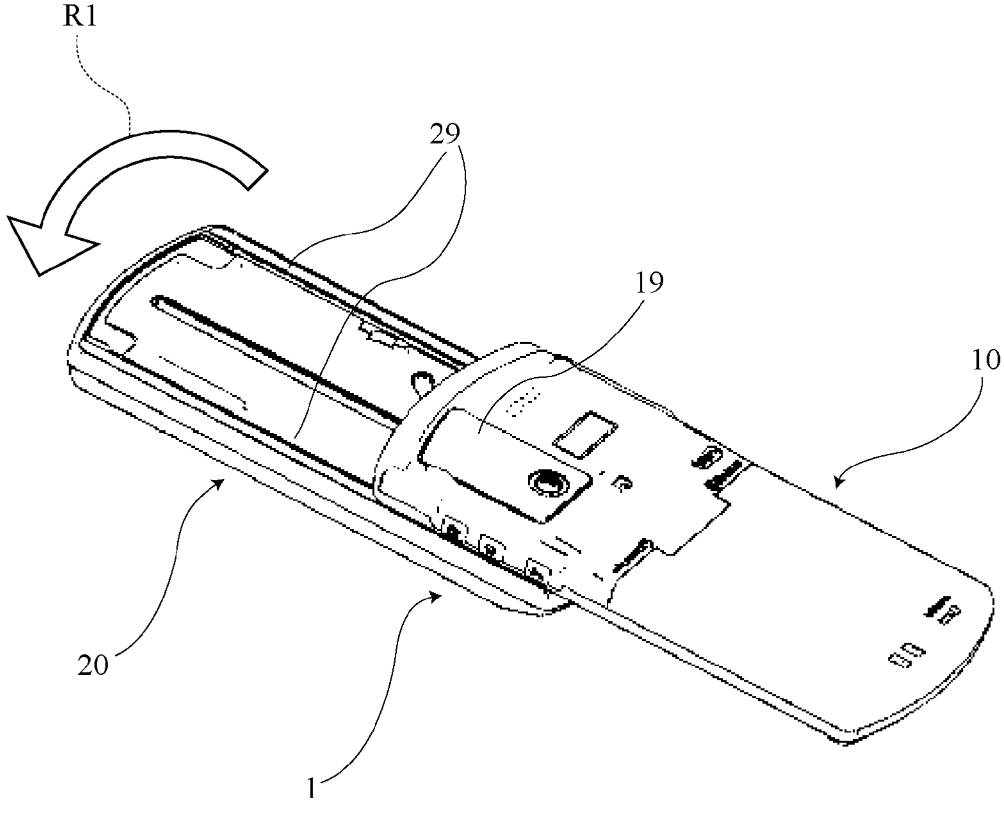
FIG. 8 is an explanatory view of an operation for moving water in the passageway into a retainer portion.

FIG. 8 is an explanatory view of the operation for moving the water W in the passageway P toward the retainer portion R. A user grasps the chassis 10 sliding the chassis 20, swings the chassis 20 in the direction of an arrow R1, and then stops the chassis 20. Herein, the direction of arrow R1 is along a direction from the straight portion 45 of the double-stick tape 40 to the cutout portion 46. The chassis 20 is made to swing and then stop, thereby discharging a part of the water W and moving the remaining of the water W from the passageway P toward the retainer portion R by inertia force. This operation can suppress the influence on the acoustical characteristics, even when the water enters the housing 20 through the opening OP. Additionally, as illustrated in FIG. 8, a camera 19 is provided at the rear surface of the chassis 10. The rear surface of the chassis 20 is provided with guiding channels 29 for achieving the sliding of the chassis 20 relative to the chassis 10.

Also, the portable telephone 1 is generally used with its posture set in the vertical direction thereof while talking on the portable telephone 1. Thus, while talking of the portable telephone 1, the chassis 20 is postured such that the axis of the opening OP is along the horizontal direction and the opening OP is located at a vertical upper side of the receiver 60. The portable telephone 1 is used with such a posture. For this reason, as illustrated in FIGS. 4, 5, 7A, and 7B, in such a posture of the portable telephone 1, the retainer portion R is located at the vertical lower side of the passageway P, that is, at the oblique lower side. For this reason, while talking of the portable telephone 1, the water retained in the retainer portion R is prevented from flowing toward the passageway by a gravitational force. This also suppresses the influence on the acoustical characteristics on the phone.

Next, a description will be given of a portable telephone having a structure different from that of the portable telephone according to the present embodiment.

Figure 9A:
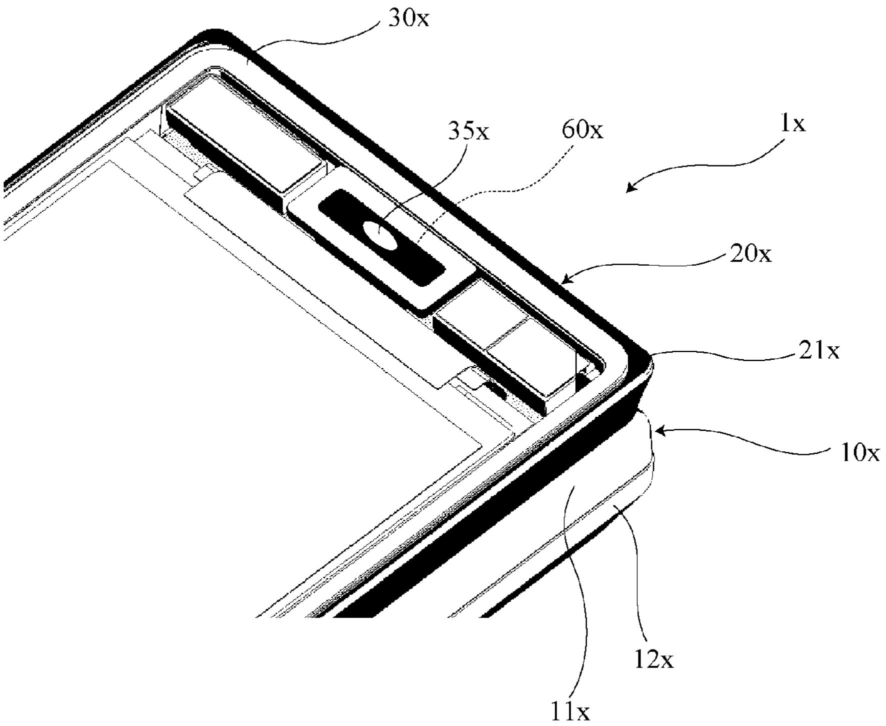
FIGS. 9A and 9B are explanatory views of a portable telephone with a structure different from that of the portable telephone according to the present embodiment.
Figure 9B:
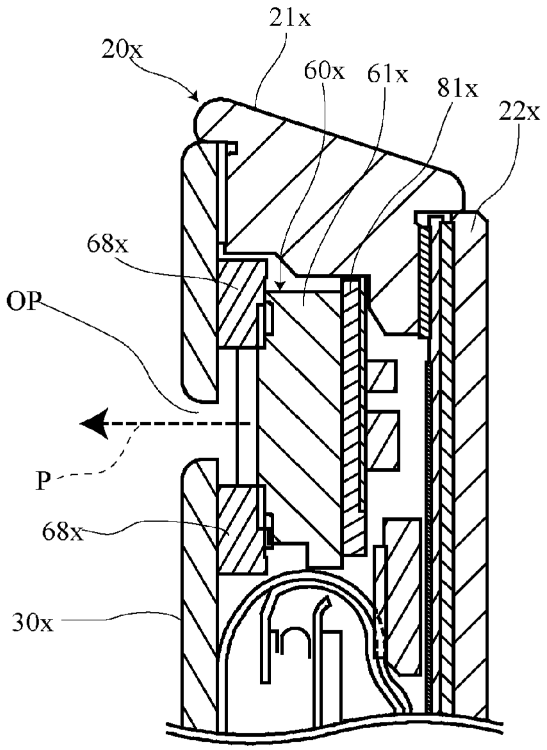

FIGS. 9A and 9B are explanatory views of the portable telephone having a structure different from that of the portable telephone according the present embodiment. A portable telephone 1*x* has chassis 10*x* and 20*x* coupled to each other to be relatively moved. The chassis 10*x* includes a front case 11*x* and a rear case 12*x*. The chassis 20*x* includes a front case 21*x* and a rear case 22*x*. A touch panel 30*x* is provided at the front case 21*x* side. The touch panel 30*x* is formed with an opening 35*x* defining an opening OPx. A buffering member 68*x* is arranged between a receiver 60*x* and the touch panel 30*x*. The receiver 60*x* is mounted on a flexible printed circuit board 81*x*. A passageway Px has a straight shape communicating the opening OPx and the receiver 60*x* with each other. That is, an axis of the opening OPx is substantially identical to the central axis of the receiver 60*x*. Thus, a position of opening OPx is set such that receiver 60*x* is coaxially arranged with the axis of the opening OPx. This is because the water entering the passageway Px is easily discharged from the passageway Px. However, a position of opening OPx is limited to the position of the receiver 60*x*, thereby limiting the freedom degree of the positional setting of the opening OPx. Regarding the portable telephone according to the present embodiment, the retainer portion R is provided within the chassis 20, thereby improving the freedom degree of the positional setting of the opening OP. This improves the freedom degree in design of the chassis 20 of the portable telephone 1.

The above embodiment has described the receiver converting electrical signals into sound as an example of a converting portion converting one of an electrical signal and sound into the other thereof. However, the above structure may be applicable to a microphone converting sound into electrical signals.

Additionally, the above embodiment has described the slide type of the portable telephone 1. However, the portable telephone 1 may be foldable type.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the sprit and scope of the invention.

What is claimed is:

1. A portable terminal device comprising:

a converting portion that is one of a receiver which converts an electrical signal into a sound and a microphone which converts a sound into an electrical signal; and a chassis comprising: an opening; a passageway portion communicating the opening and the converting portion with each other; and a retainer portion retaining water that has entered the passageway portion, divaricated from the passageway portion, and the converting portion being arranged within the chassis and being apart from an axis of the opening, wherein the retainer portion is located at a vertical lower side of the passageway portion, when the chassis is held such that the axis of the opening is along a horizontal direction and such that the opening is located at a vertical upper side of the converting portion, and wherein the chassis comprises: a case; a support plate held by the case; a touch panel held by the support plate; and a double-stick tape attached between the support plate and the touch panel;

the opening is formed by the touch panel and the case, and the passageway portion and the retainer portion are formed by the support plate, the touch panel, and the double-stick tape.

2. A portable terminal device comprising:

a receiver converting an electrical signal into sound; and a chassis comprising: an opening; a passageway portion communicating the opening and the receiver with each other; and a retainer portion retaining water that has entered the passageway portion, divaricated from the passageway portion, and the receiver being arranged within the chassis and being apart from an axis of the opening, wherein the retainer portion is located at a vertical lower side of the passageway portion, when the chassis is held such that the axis of the opening is along a horizontal direction and such that the opening is located at a vertical upper side of the receiver, wherein the chassis comprises: a case; a support plate held by the case; a touch panel held by the support plate; and a double-stick tape attached between the support plate and the touch panel;

the opening is formed by the touch panel and the case, and the passageway portion and the retainer portion are formed by the support plate, the touch panel, and the double-stick tape.

3. A portable terminal device comprising:

a microphone converting sound into an electrical signal; and a chassis comprising: an opening; a passageway portion communicating the opening and the microphone with each other; and a retainer portion retaining water that has entered the passageway portion, divaricated from the passageway portion, and the microphone being arranged within the chassis and being apart from an axis of the opening, wherein the retainer portion is located at a vertical lower side of the passageway portion, when the chassis is held such that the axis of the opening is along a horizontal direction and such that the opening is located at a vertical upper side of the microphone, wherein the chassis comprises: a case; a support plate held by the case; a touch panel held by the support plate; and a double-stick tape attached between the support plate and the touch panel;

the opening is formed by the touch panel and the case, and the passageway portion and the retainer portion are formed by the support plate, the touch panel, and the double-stick tape.

* * * * *